United States Patent

Bauhahn et al.

[11] Patent Number: 5,483,387
[45] Date of Patent: Jan. 9, 1996

[54] HIGH PASS OPTICAL FILTER

[75] Inventors: Paul E. Bauhahn, Fridley; Thomas Ohnstein, Roseville; James D. Zook, Minneapolis, all of Minn.

[73] Assignee: Honeywell, Inc., Minneapolis, Minn.

[21] Appl. No.: 279,762

[22] Filed: Jul. 22, 1994

[51] Int. Cl.⁶ .............................. G02B 5/28; G02B 5/18; G02B 5/22
[52] U.S. Cl. .................. 359/885; 359/578; 348/341; 348/342
[58] Field of Search ........................ 359/66, 82, 885, 359/886, 887, 888, 889, 890, 891, 892, 326, 850, 852, 578, 579, 498; 348/342, 341, 345, 357, 750

[56] References Cited

U.S. PATENT DOCUMENTS

| | | | |
|---|---|---|---|
| 3,659,919 | 5/1972 | Williams | 359/578 |
| 3,660,664 | 5/1972 | Pasmeg | 359/886 |
| 3,910,683 | 10/1975 | Nishino et al. | 359/576 |
| 4,496,634 | 1/1985 | Cline | 359/566 |
| 4,553,816 | 11/1985 | Durand et al. | 359/578 |

*Primary Examiner*—Paul M. Dzierzynski
*Assistant Examiner*—Mohammad Y. Sikder
*Attorney, Agent, or Firm*—Paul H. McDowall

[57] ABSTRACT

A microstructure device having a array of deep lamellar structures resembling parallel plates has sharp high pass cut-off behavior associated with incident TE polarized radiation. When two such microstructures are disposed in an orthogonal orientation, they act like a 2-D array of rectangular waveguides with the cut-off behavior determined by the separation of the respective parallel plates. Another embodiment of the present invention employs a linear drive to articulate the array of coupled parallel plates to tune the filter to the operative incident radiation relatively independent of the angle of incidence. The microstructure finds application placed proximate the focal plane of an array of radiation sensitive material so that very high resolution multispectral images may be generated. When the array is articulated by a linear actuator, a preselected cut-off frequency may be tuned so that multispectral imaging occurs independent of the imaging technology employed, with applications for remote sensing of chemical agents, satellite surveys of agricultural resources, meteorological conditions, or environmental quality. When disposed in a gas absorption cell, opposing an IR source and proximate an IR detector the tunable filter can be used for gas analysis.

20 Claims, 9 Drawing Sheets

Multispectral Imaging System

Crossed Arrays of Parallel Plates

Basic LIGA Process

1. Expose

2. Develop PMMA and Electroplate (Ni).

Fig. 12C

3. Remove Remaining PMMA.

Passivate wafer—both sides
Deposit, pattern and passivate first-level masks.
Via cut for transmission window.
Via cut to metals.
Deposit/pattern sacrificial layer.

Fig.13F

Etch to remove plating base and sacrificial layer—releasing movable structures from the substrate.

Fig.13B

Deposit plating base metals.

Fig.13G

Anisotropically etch silicon wafer from the backside to SiN/oxide diaphragm.

Fig.13C

Deposit thick PMMA resist layer.
X-ray radiation exposure using synchrotron.

Fig.13H

Plasma etch to remove SiN/oxide diaphragm to open substrate transmission window.

Wire bonds to complete coils.

Fig.13D

Develop pattern in PMMA and plate metal into pattern.

Fig.13I

Top View

Fig.13E

Remove PMMA resist layer.

HIGH PASS OPTICAL FILTER

FIELD OF THE INVENTION

The present invention relates to the field of optical filters, and in particular, a tunable microstructure using micromachined structures of parallel-plate arrays with tightly controlled spacing and uniform movement, provided by flexible coupling between the plates, thus resulting in a tunable and sharp cut-off characteristic.

BACKGROUND OF THE INVENTION

As optical transmission filters the parallel-plate arrays of the present invention complement conventional bandgap filters, which are low-pass filters (i.e., they transmit photons having energies below the band gap of the material). However the transmission cut-off characteristics of the devices of the present invention are much sharper than those of most crystalline solids, especially in the infrared (IR) spectrum. The present invention is also superior in performance to multilayer dielectric filters because the multilayer dielectric filters are not wide-angle devices, unlike the devices of the present invention the main advantage of the present filters, unlike bandgap multilayer dielectric filters, the present filters are tunable. Fabry-Perot filters are tunable but have a very restricted field of view. In addition, the present filters are much more compact and rugged than tunable Fabry-Perot filters.

The only other work known to the inventors on optical filters using micromachined structures is that described by MicroParts, a company based in Germany, in a 1991 brochure, in which is described infrared bandpass and high-pass filter being developed for the Infrared Space Observatory (ISO) of the European Space Agency. These are self-supporting metal foils to be used in the ISOPHOT IR photometer. The high transparency highpass filter uses a honeycomb structure which gives stability but does not allow tuning as does the parallel-plate arrays. The MicroPart designs are effective for all polarizations of the incident radiation, which is an advantage given their design.

Some very interesting optical properties of periodic structures involve the localization of light. This is an active area of research, reviewed by Sajeev John in Physics Today, May 1991, page 32. An application of deep lamellar structures used as Bragg resonators is the concentric-circle-grating surface-emitting semiconductor lasers, which have been demonstrated previously and are reviewed in Optics Photonics News (Dec. 1992, page 41).

Some infrared (IR) emission characteristics of deep lamellar gratings have been measured in the 10 to 20 micron region by T. K. Wang and J. N. Zemel (Applied Optics, vol. 31, Feb. 1992, page 732). It was found that the emission peaks do not correlate directly from the grating equation. The inventors of the present invention suggest that among other things, using the lamellar structures as tunable filters for blackbody radiation rather than using them as the emitters themselves, as practiced by Wang and Zemel, provides far better correlation.

SUMMARY OF THE INVENTION

The devices made possible by the present invention find application disposed proximate radiation detectors or detector arrays (at the focal plane), and preferably within the depth-of-field of the imaging optics for the detector array. Given the approach to making the optical filters of the present invention, scaling the size of a single microstructure filtering device to provide a larger radiation-admitting window area encounters limits only in the size of the substrate begin used and the x-ray exposure area of the processing equipment. The devices of the present invention provide a sharp cut-off characteristic because of the well-coordinated movement which maintains equal spacing between the parallel plates associated with the filter portion of the microstructure. An important feature of the present invention relates to the fact that in operation, coupled to a suitable linear tuning actuator, the filters may be carefully tuned to a desired cut-off frequency for one polarization of the incident radiation. Although polarization is usually viewed as a disadvantage, it is the key feature that allows the tunability of the structures of the present invention. When two tunable filters cooperate to filter radiation, and are placed at right angles to each other, both polarizations can be tuned by keeping the spacing between successive parallel plates equal. Transmission is extremely low below the cut-off wavelength independent of the angle of incidence of the radiation, because the filters act like crossed polarizers, which are well known to be devices having a wide field of view.

BRIEF DESCRIPTION OF THE DRAWINGS

FIG. 1a is a perspective view of a tunable optical filter constructed in accordance with the present invention FIG. 1b is an elevational side view of the structure of FIG. 1 a.

FIG. 12($a$–$d$) are graphical representations of the basic LIGA process.

FIG. 13($a$–$i$) are graphical representations of the processing sequence for creating the tunable optical filters of the present invention FIG. 14($a$–$c$) illustrates the filter and an actuator in operation, according to the present invention.

DESCRIPTION OF THE PREFERRED EMBODIMENT

Figure 9:
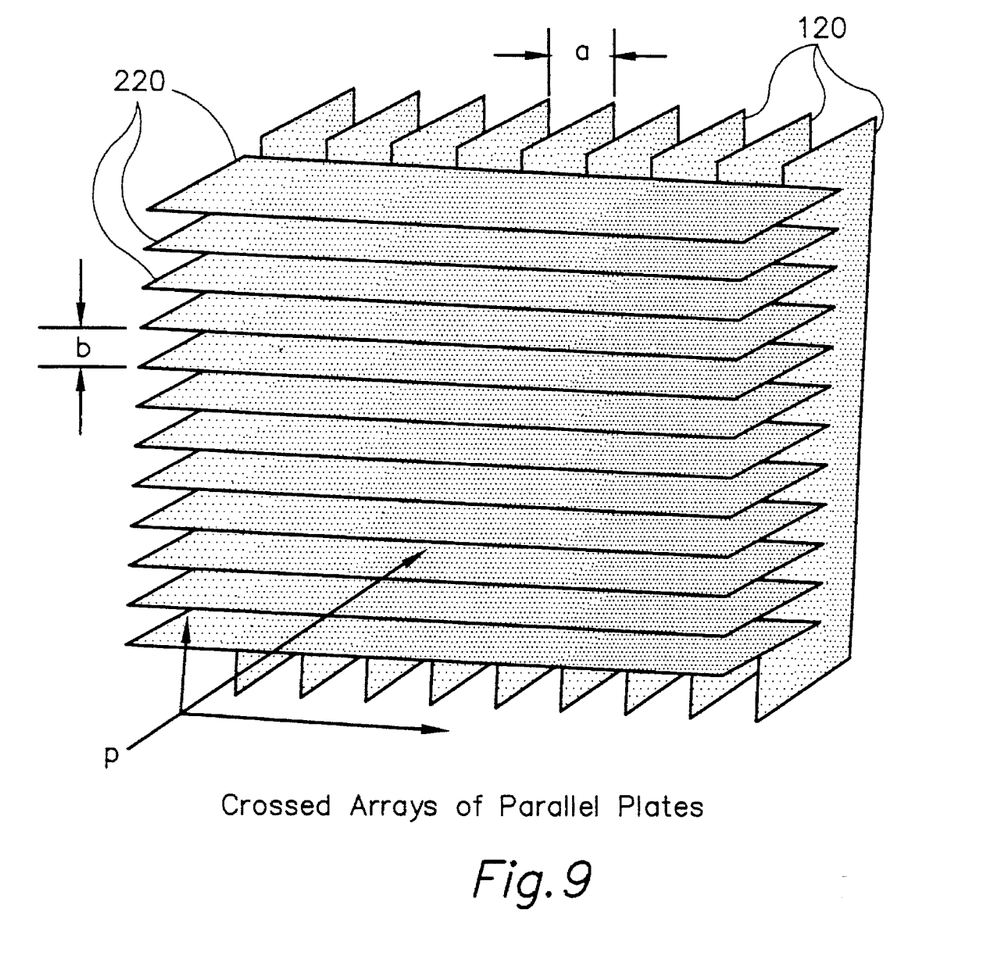
FIG. 9 is an illustration showing crossed filter array architecture of one application of the present invention, whereby the filters act like an array of rectangular waveguides.

A preferred method of fabricating the microstructures of the present invention is called the LIGA process a basic process diagram appears at FIG. 12. LIGA is a German acronym for "LIthograpi Galvanoformung Abformung" and is an example of a microfabrication technique that lends itself to fabricating vertical metallic parallel plates with extremely well defined spacings between each plate. As seen in FIG. 9, two such parallel plate arrays 120,220 at right angles to each other, or orthogonally oriented, forms in effect a 2-D array of rectangular waveguides. Each array 120,220 acts as an extremely effective polarizer at long wavelengths (wire grid polarizers are commonly used in the IR) so that the crossed array pair has excellent extinction ratio characteristics and reflects all incident radiation (arrow designated "p") above a certain cut-off frequency. A parallel plate array transmits waves with polarization such that the electric field of the electromagnetic waves are perpendicular to the metal plates, which is called the TM polarization. Alternatively, TE polarization has its polarization parallel to the plates and thus exhibits opposite cut-off behavior, that is, does not transmit the radiation at long wavelengths. The cut-off behavior is expressed in terms of the cut-off frequency as the quotient of the speed of light over twice the spacing between the plates ("a", "b"), or in terms of the cut-off wavelength as twice the spacing between the plates.

Figure 2:
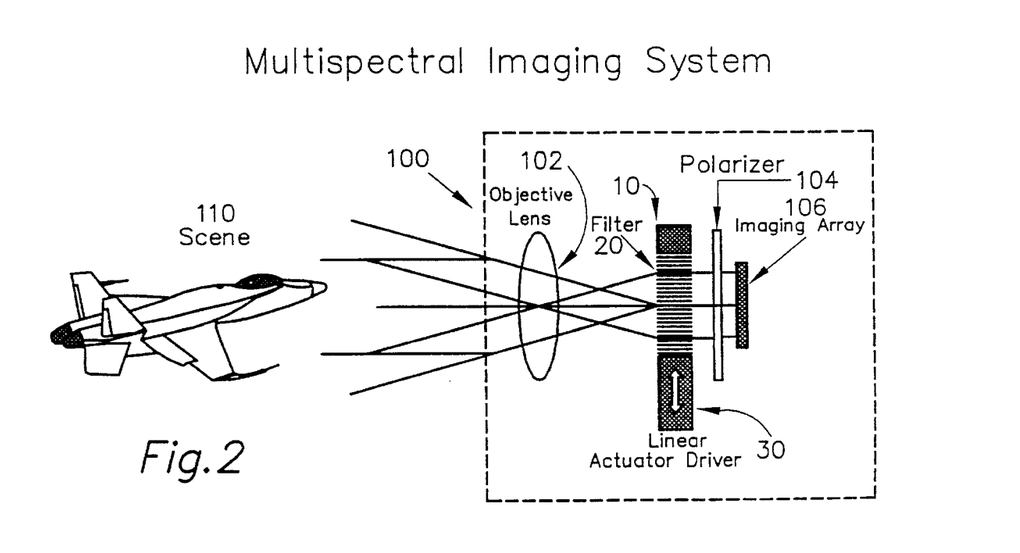
FIG. 2 is an illustration showing the salient components of a multispectral imaging system utilizing the tunable optical filter of the present invention.
Figure 11:
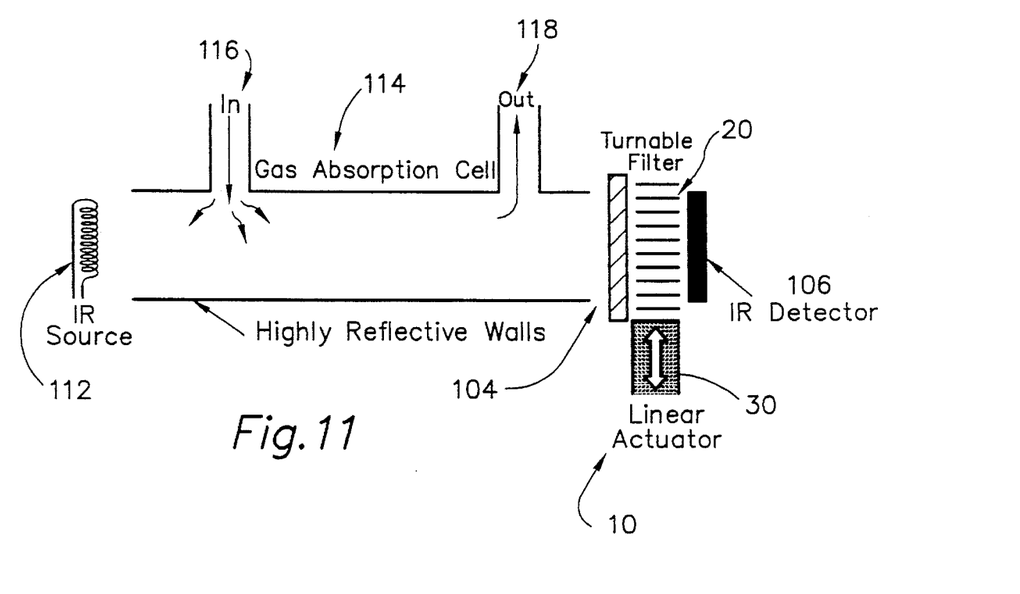
FIG. 11 is an elevational side view in cross section showing a gas analyzer built using the optical filter of the present invention.
Figure 12A:
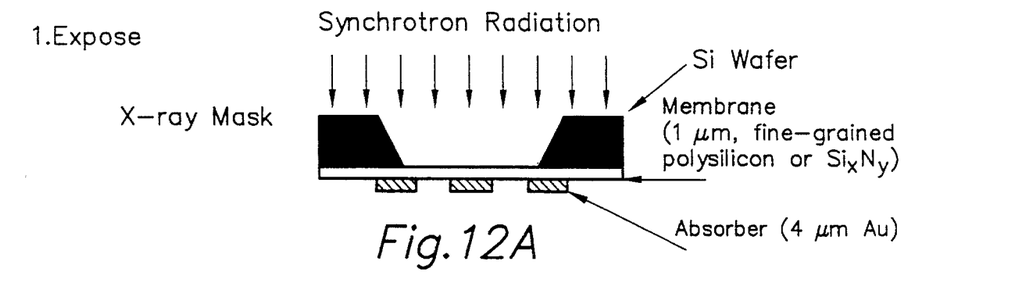
Figure 12B:
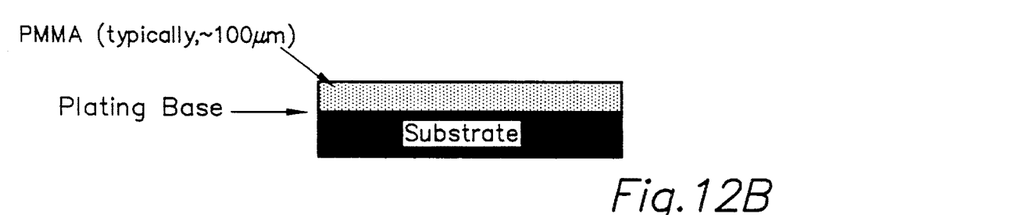
Figure 12C:
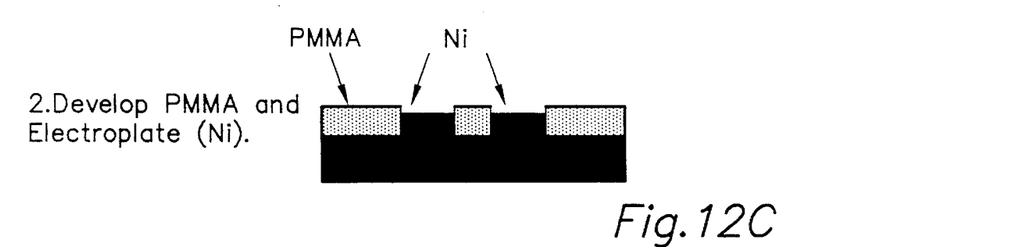
Figure 12D:
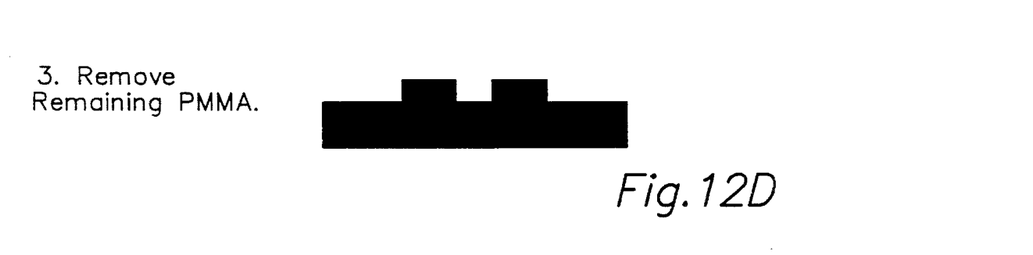

Since the plate structures are much deeper than the gap spacing between the plates, they act as very strong attenuators below the cut-off frequency. Since good electrical conductors do not absorb radiation, they have high transmission above the cut-off frequency. Thus, crossed arrays of parallel-plate structures like those of FIG. 9 that have equal spacings are ideal high-pass optical filters with cut-off characteristics that do not depend on the angle of incidence or polarization. As optical transmission filters the parallel-plate arrays complement crystalline filters, which are low-pass filters (below the energy gap of the material). However, their transmission cut-off characteristics will be much sharper than those of crystalline solids, especially in the infrared spectrum. They also will be superior to multilayer dielectric filter because those are not wide angle-of-incidence devices. The trade-off is that parallel-plate arrays will reflect and transmit grating-like field patterns with strong polarization characteristics. However in the present invention, and as shown in FIG. 2 and 11, the filters are placed next to detectors (at the focal plane) and preferably within the depth of field of the imaging optics. The filters of the present invention can be scaled up to large areas, limited by the size of the substrate 26 being used, the exposure area used to expose the photoresist, and the mechanical strength of the structure.

Figures 1A, 1B:
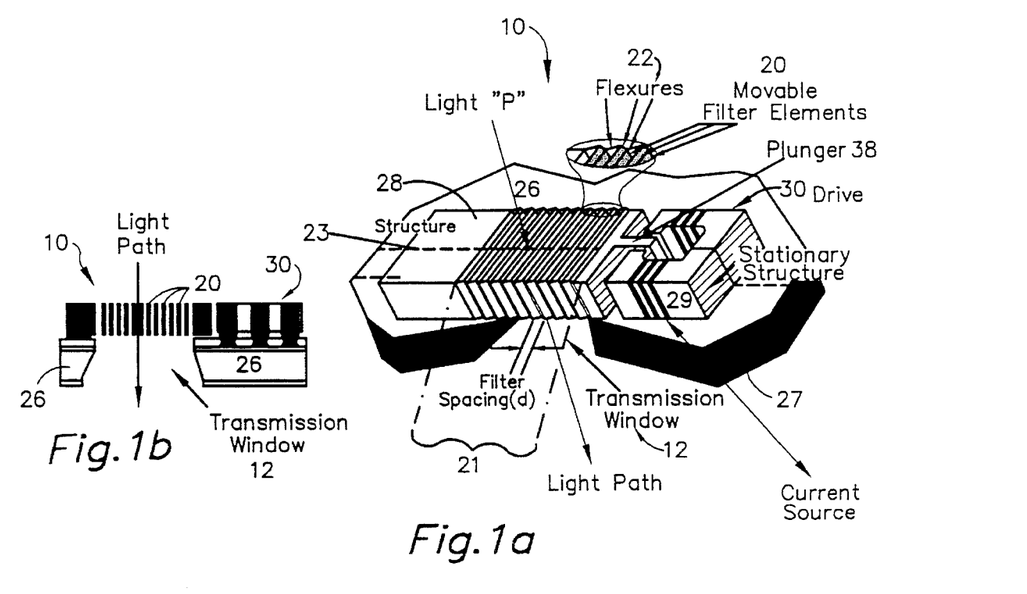
Figure 8:
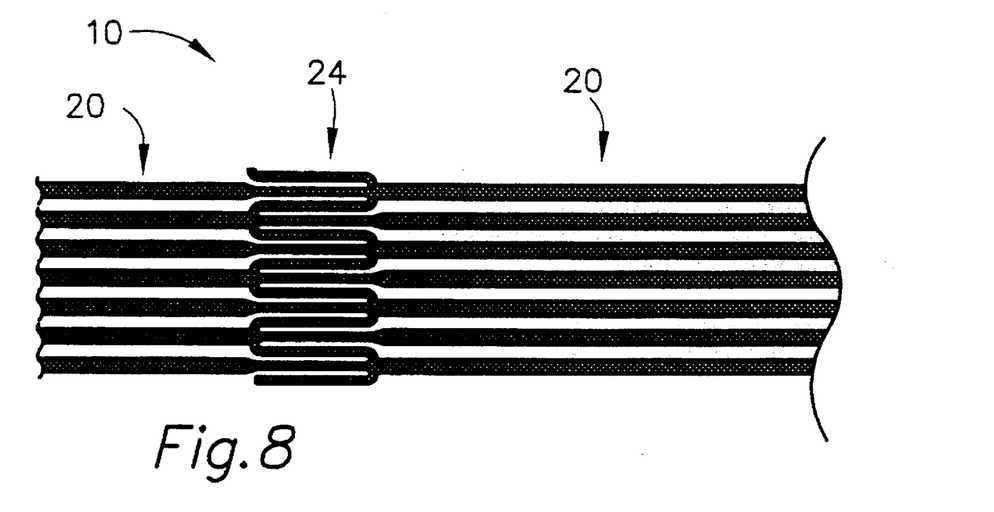
FIG. 8 is a top plan view of a flexure located intermediate the filter element of the present invention.

The plate structures of the present invention are coupled together with accordion-like flexures 22 that allow the parallel plate spacing ("d" in FIG. 1) to be changed over a factor of two or more without exceeding the elastic limits of the flexure material. The flexure 22 material and the filter plates 20 are fabricated from a material having high yield strength, such as electro-deposited permalloy (78% Nickel, 22% Iron). The flexures 22 both couple and space apart successive plate members. When implemented in relatively small area plates the flexures 22 are only required at the sides of the plates, along the lateral dimension parallel to the axial motion which occurs when the array 21 is articulated. In large area arrays such as the portion shown in FIG. 8 at 24, intermediate flexures added for structural support to maintain structural integrity, as long as the incident radiation "p" is not inhibited.

The plates and flexures form a periodic array of rhombohedral unit cells, each having a large aspect ratio and an acute cell angle. By alternating the orientation of the flexures 22 between successive plates 20, a highly compressible and extendible structure results along the direction of linear motion and perpendicular to the plates 20.

Figure 6:
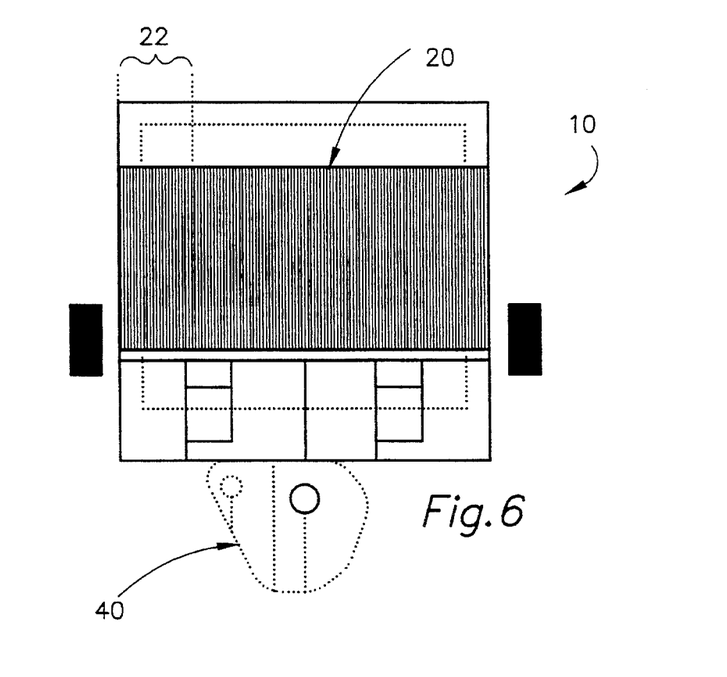
FIG. 6 illustrates a cam driver usable with the present invention.

The LIGA fabrication method (shown in FIG. 12) allows the filter array 21 and linear actuator 30 to be cofabricated using a single LIGA mask and the same lithography and electroplating process. As seen in FIG. 6, since the basic filter structure is completely periodic, the mask layout is very simple.

Figure 13A:
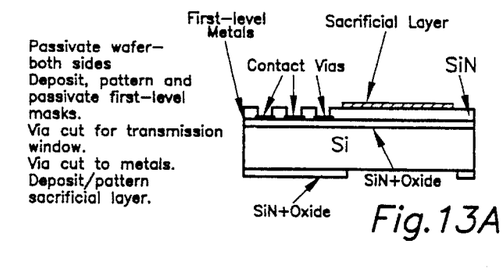
Figure 13B:
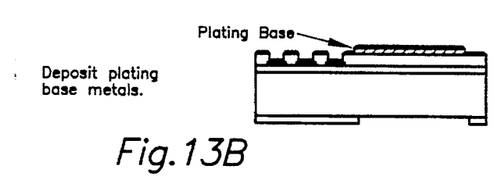
Figure 13C:
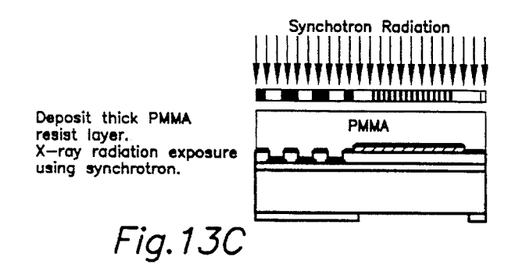
Figure 13D:
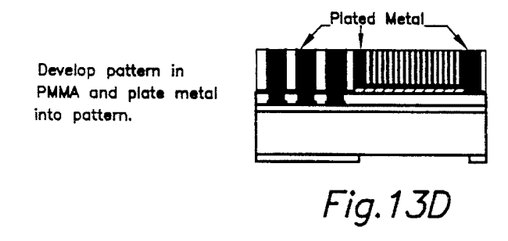
Figure 13E:
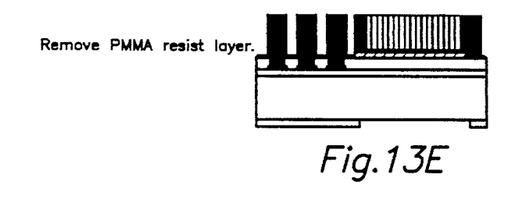
Figure 13F:
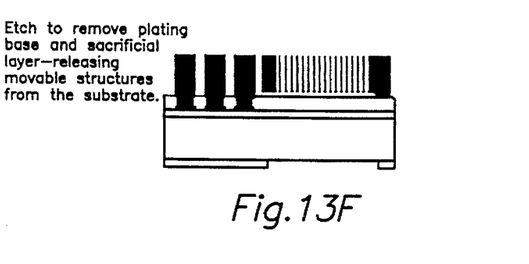
Figure 13G:
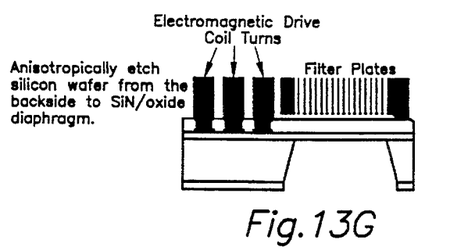
Figure 13H:
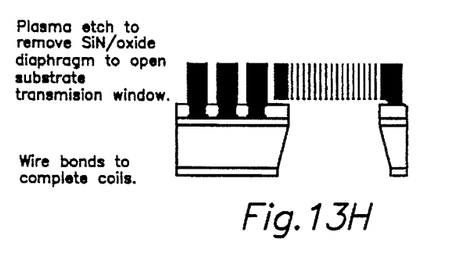
Figure 13I:
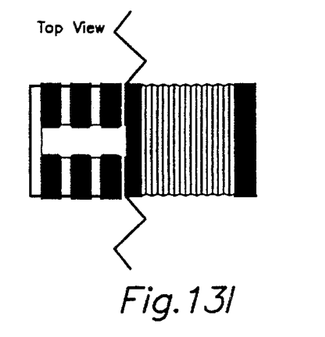

The filter structures of the present invention have very high aspect ratios and edge acuity, with representative structures rising 30 microns from the substrate 26 with aspect ratios of 10:1 and edge acuity less than 0.1 micron per 100 micron of structure height demonstrated thus far. The addition of a sacrificial layer (shown at FIG. 13(f)), which allows portions of the structures, or even entire structures, to be released from the substrate 26 provides versatility for integrating the present invention with actuators 30 and other system elements. Other advantages obtain from the use of magnetic plated material covering the plates 20 so that magnetic actuators can be used for the linear drives (see FIG. 5).

Figure 3:
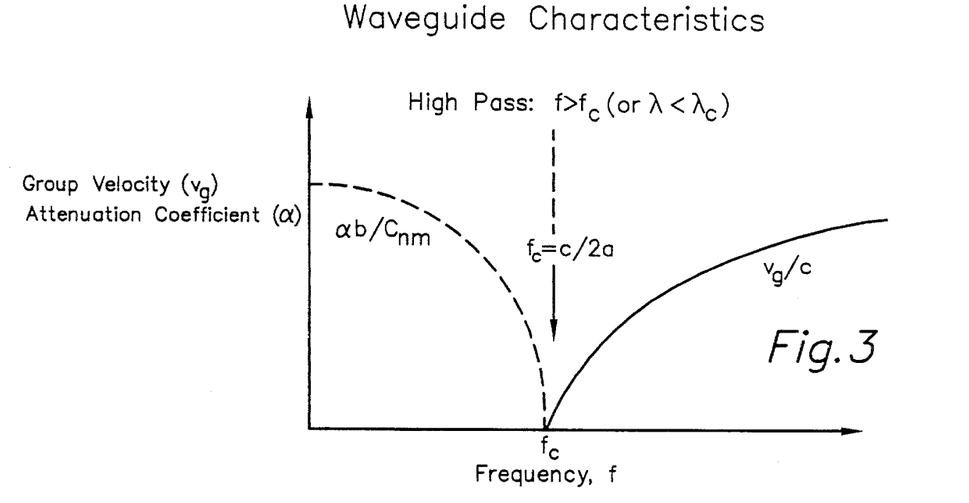
FIG. 3 is a graph illustrating optical waveguide characteristics.
Figure 4:
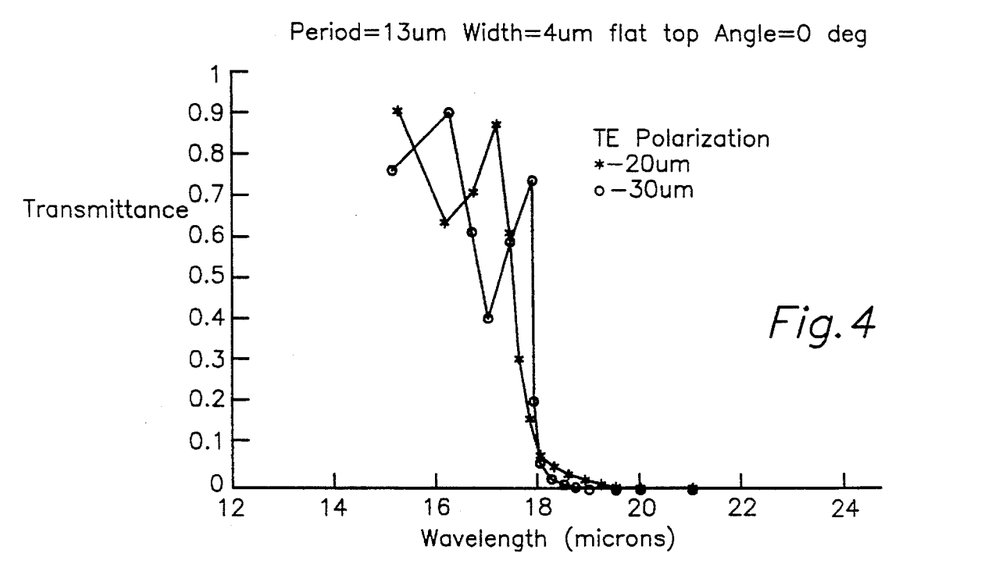
FIG. 4 is a graph of mathematical modeling results showing depth of the lamellar structures of the present optical filters providing a relatively sharper cut-off.

Referring to FIG. 3, the expectation of near-ideal high pass filter behavior that makes these applications possible is well founded. Electromagnetic theory of perfectly conducting waveguides show that there are two types of waves that can propagate above the cut-off frequency, the TM modes and the TE modes. The group velocity for the signals propagating down the waveguide, is given by $$v_g = c \sqrt{1 - \left(\frac{f_c}{f}\right)^2} \quad f > f_c$$

which goes sharply to zero as the cut-off frequency is approached from above. Below the cut-off frequency the waves are attenuated exponentially with an attenuation coefficient:

$$a = \frac{C_{nm}}{b} \sqrt{1 - \left(\frac{f}{f_c}\right)^2} \quad f < f_c$$

Which goes to zero as the cut-off frequency is approached from below. The coefficient $C_{nm}$ depends on the mode numbers, n and m. The cut-off wavelength for each mode depends on the polarization and mode number. (The result of these equations are illustrated in FIG. 3)

This analysis implies that a crossed pair of arrays of thin parallel plates (120,220 in FIG. 9) should provide almost ideal filter characteristics, switching from perfectly reflecting at long wavelengths to highly transmitting of one polarization at shorter wavelengths. The cut-off is set by the larger of the two plate spacings ("a" or "b"). At even shorter wavelengths, which is set by the smaller plate spacing, both polarizations are transmitted. If the two arrays have equal spacings, then the crossed pair possesses nearly ideal high-pass filter characteristics independent of polarization and angle of incidence. The deviations from the ideal will be due to the finite conductivity of the metals used to fabricate the plates, at the frequencies of interest. These deviations are stronger at large angles of incidence and at wavelengths significantly below the cut-off. These effects may be compensated for by judicious design and material selection. Less than ideal behavior may also result from surface roughness and lack of parallelism of the metal plates.

The system combination 10 of the tunable filter array 21 and a LIGA-fabricated actuator 30 for generating a closely controlled linear drive presents a preferred mode of practicing the present invention.

The details of the LIGA filter and a suitable linear actuator are illustrated in FIG. 1 in cross section through the center of the structure, and also showing a top view of the structure. Looking first at the optical filter portion 21 of the structure 10, it is appreciated that it is made up of an array of thin metallic plates, oriented vertically, or normal, to the substrate 26. The metal plates 20 can at present typically be fabricated as narrow as 3 microns wide and 30–50 microns tall. The overall size or area of the parallel plate array 21 that comprises the filter may typically be on the order of 1 mm× 1 mm but the size is a function of the x-ray exposure area and the substrate 26 size so there is no fundamental reason why these structures cannot be scaled up or down in size. The filter will operate as a transmission filter. The light path is shown in the cross sectional view. Parallel plates 5 microns thick, 30 microns deep and 2 mm long have been fabricated successfully by the LIGA process at the University of Wisconsin, Madison, Wis., USA.

Figure 7:
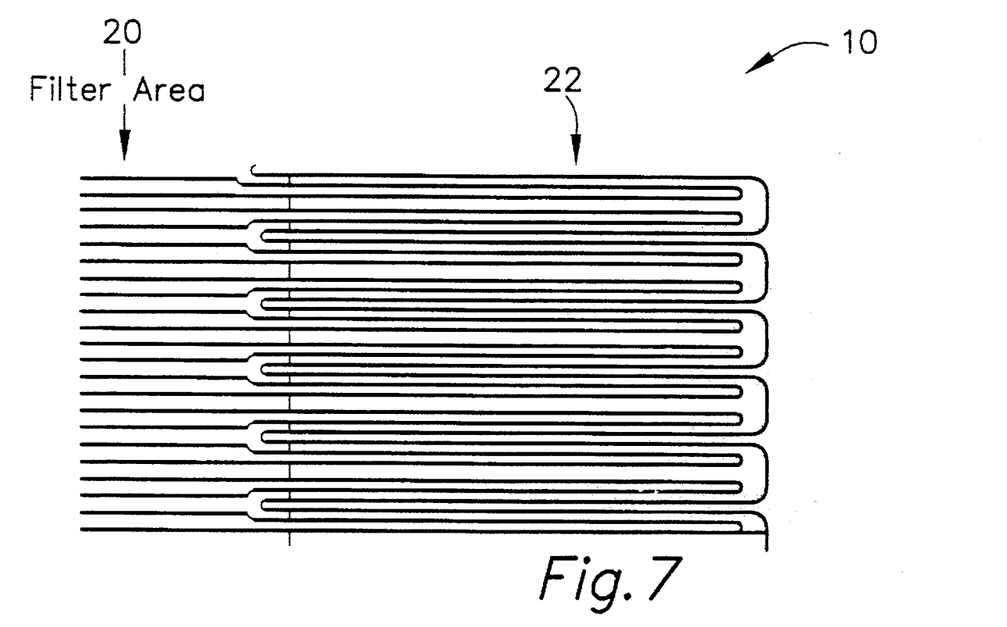
FIG. 7 is a top plan view of the preferred flexures of one embodiment of the present invention.

The array 21 of parallel metal plates 20 are connected at two sides by the thin metal flexures 22. The accordion-like flexures 22 at the sides can be seen in the plan view of FIG. 7 and 8. The parallel plate array is attached at one end to a first support structure 28 which is fixed to the substrate 26. The other end of the filter is attached to a second support structure 29 which in Fig 1 comprises part of the linear magnetic drive 30. The filter plates 20, flexures 22, and plunger 38 of this structure 10 are free to move along the longitudinal axis, shown as dotted line 23. A sacrificial layer (FIG. 13 at (f)), which is patterned under the filter structure during processing and removed at the end of processing, releases the filter and the movable plunger portion 38 of the structure 10 from the substrate 26. The fabrication process for these structures 10 is detailed later in this specification and shown in FIG. 12 and 13. The freely moveable portions 38 of the filter structure do not drop down and slide along the substrate surface. The depth of the filter structure, allowed by the LIGA process, provides flexural stiffness that prevents the filter array 21 from sagging. The moveable end 38 of the filter is suspended above the substrate 26 by the second support structure 29 as part of the linear drive 30. All the parts of the structure 10 can be fabricated in place at the same time. No assembly of parts is necessary to form this filter structure. However, it may be useful to fabricate the filter and then assemble it on to the actuator mechanism.

The basic period of the filter is determined by the thickness of the metal plates 20 and the spacing between the plates. If the period was, for example, 10 microns and the metal plates were 3 microns thick, the gap between plates would be 7 microns and the wavelength cut-off of this particular structure would be 14 microns. The practical minimum width of the metal plate that can be fabricated with the LIGA process is presently about 3 microns. This is limited only by the current x-ray mask technology and is not a fundamental limit of the x-ray exposure process. It is nearly certain that in the future much narrower line widths will be possible.

The cut-off wavelength of the structure 10 can be changed or tuned by means of the linear drive actuator 30. The linear drive 30 extends or compresses the array 21 thus changing the spacing between the plates 20 and thereby the cut-off wavelength of the filter. The linear drive actuator 30 can be operated in several modes. For example, they can be moved in fixed steps, holding the filter at a spacing fixed by each step; they can be moved continuously to scan the cut-off through the wavelength range of the filter, or resonated (or modulated) to enable wavelength modulation spectroscopy with the filter.

Looking again at FIG. 1, the linear actuator 30 of the structure 10, is a simple electromagnetic drive for the tunable filter is illustrated. This simple actuator 30 is used to illustrate one potential approach to a linear drive for the filter. The actuator is cofabricated and no assembly of parts is required. This will result in the entire filter/actuator structure being made from a single magnetic material such as NiFe. In this simple design the linear actuator 30 consists of an electromagnet 27 and a plunger 38. The electro magnet 27 is fixed to the substrate 26 and is made up of a core with a solenoid-like coil of conductor turns surrounding the core. In the present single-level LIGA process, coil turns are completed across the top by wirebonding.

Figure 14A:
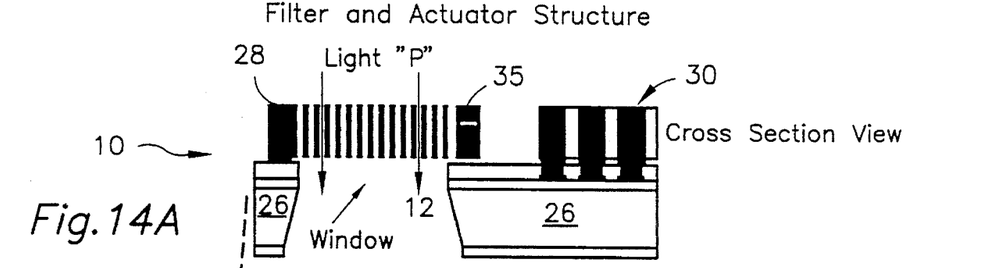
Figure 14B:
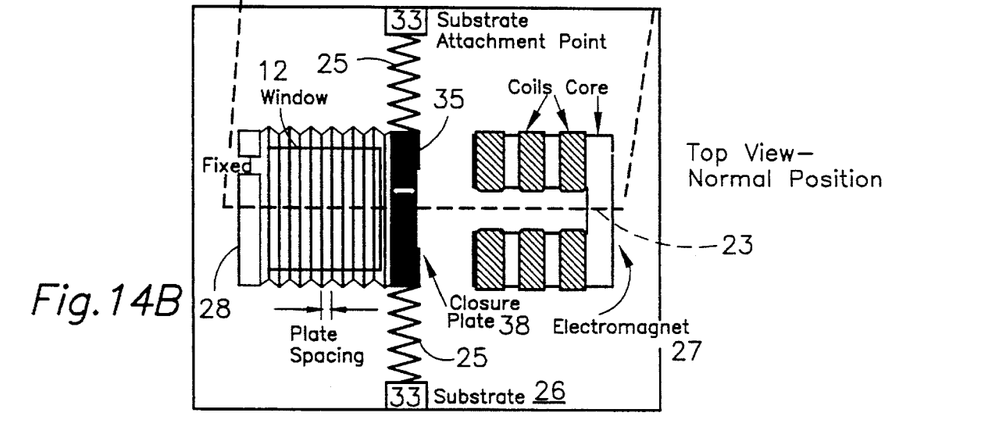
Figure 14C:
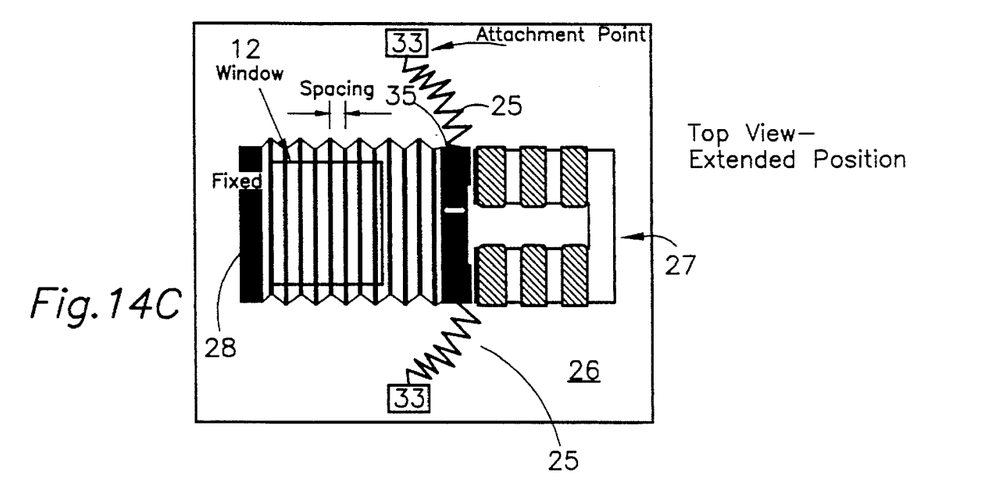

The plunger 38 is attached to the end of the array of plates 21 and flexures 22 that make up the filter. The moveable portion of the structure, which includes the filter array 21 and the plunger 38, are suspended above the substrate 26 by the guide springs 25 attached to the sides of the filter endpiece 35 so as to limit or eliminate lateral movement when the magnet is activated and driving the array 21 in the longitudinal direction along axis 23. The electromagnet 27 is actuated by applying an electrical current to the coil thus pulling the actuator into the tapered pole pieces. As the plunger 38 is pulled into the electromagnet 27, the side support flexures 22 bend as the filter is extended. This extended position is illustrated in FIG. 14. The filter flexures 22 connecting the filter plates 20 also extends as described previously and the filter characteristics can thus be varied. Alternatively actuator drives can be designed to extend or compress the filter array 21. Solenoid plunger-type drives and linear motor drives could also be used to actuate the filter instead of the electromagnet plunger-type drive.

MULTISPECTRAL IR IMAGING

The tunable optical filters of the present invention, when combined with appropriate objective lenses 102, polarizers 104 and IR sensor arrays 106 can be used to accomplish multispectral imaging as shown in FIG. 2. Thus, full spectrum IR imaging systems can distinguish between temperature variations and emissivity variations in an object, which can be very important in industrial process control applications. Or, for example, an image of an air vehicle exhaust could reveal not only its temperature but also its chemical composition. The imaging system illustrated in FIG. 2 incorporates a tunable IR filter 10 fabricated in accord with the present invention, a polarizer 104 and an IR sensor array 106. Note that the polarizer 104 may be placed on either side of the filter 10 and still operate effectively. The tunable filter array is mounted in the focal plane of the IR sensor imaging array and used as a wavelength cut-off filter. In operation, the imaging system 100 will be illuminated with IR sources of various temperatures and emissivities and the IR sensing array will be used to image the sources. Multispectral imaging is demonstrated by using the tunable filter to separate two wavelength bands: 8–14 microns and less than 8 microns. This requires that the tunable filter will have to move sufficiently to change its parallel plate gap spacing by approximately a factor of two. The tunable high-pass filter allows variation of the cut-off over the useful wavelength range of the detector material. The decrease in detector output as a the filter cut-off wavelength is decreased provides direct measurement of the spectral content of the radiation causing the detector response. Thus, conventional broadband detectors and imaging systems can be programmed to supply both spectral information and total intensity information. In imaging applications, this increased capability is analogous to the difference between color and black and white television. In a thermal imager it will allows separation of temperature information from emissivity information or could identify the presence of spectrally active vapors and gases.

The multispectral imager embodiment may be used with cooled or uncooled IR imaging systems with further applications for remote sensing of chemical agents, satellite surveys of agricultural resources, meteorological conditions, or environmental quality. Also, it can be used for non-contact temperature measurements, for example, in nuclear power plants where precise temperature control is required demands the emissivity of the surface must be known, and must be assured not to change over time. The tunable IR filters provide multispectral capability thereby greatly reducing measurement errors and the need for calibration of the sensing equipment. In fact, the small apertures and coarse tunability requirements of this type of sensing application make the present invention particularly useful in a particularly demanding environment.

GAS ANALYZER

Implementation of tunable optical filters in the 1.5 to 6 micron portion of the IR spectrum can be employed as compact, low-power IR gas analyzers in the environmental monitoring and process control industries. The ruggedness and low power requirements of the present tunable fillters would make them very useful for space, terrestrial and other remote sensing applications as well. For example, very low-cost, single-wavelength $CO_2$ or $H_2O$ sensors for spectrometer gas analyzers that cover the entire IR spectrum can be made by combining the present filter with the recently developed, and patented uncooled IR imaging components and systems made by Honeywell Inc. at 10701 Lyndale Avenue South, Minneapolis, Minn., USA. The actuators 30 may be driven at their mechanical resonance so that they scan back and forth across the IR absorption lines to do wavelength modulation spectroscopy for such IR gas analysis and environmental monitoring.

Climate control in closed environments, such as in air, land, sea, and space vehicles as well as homes and other buildings require control of $CO_2$ and $H_2O$ vapor concentrations while monitoring of CO, $NO_x$, and volatile organics is required to ensure personnel safety, health, and productivity. IR spectroscopy is an ideal candidate for compact, low-power instrumentation to address these needs since it does not require vacuum pumps like mass spectroscopy or high-pressure tanks of carrier gas, as does gas chromatography. However, IR spectrometers have traditionally been large and expensive instruments that require vibration-free, low noise environments. Problems are caused by the long path lengths required for observing low concentrations of gases, the low luminosity of IR sources, and the low detectivities of known IR detectors compared to photomultipliers and CCD arrays available in the visible and UV spectrum regions. These problems are dealt with in known commercial instruments using automatic grating changers and filter changers, but these are bulky, slow, and prone to failure unless given ideal operating conditions. The tunable filters of the present invention overcome these problems with the prior art.

An ultra-compact IR gas analyzer is illustrated in FIG. 11 and comprises simply a gas absorption cell 114 having highly reflecting, preferably metal, walls with an IR source 112 disposed at a first end of the cell 114 and emits IR radiation over a wide angle which is channeled down the cell, through a sample of gas 116, 118, passes through polarizer 104 and then impinges on a tunable optical filter 10 constructed according to the present invention. Note that the polarizer 104 may be placed on either side of the filter 10 and still operate effectively. The optical filter couples the IR radiation to a single IR detector 106, of a few millimeters in area. The cell 114 length can be about ten centimeters, but the average absorption length is several times this length because of the multiple reflections from the cell walls. Since the high pass tunable filter is not direction-sensitive, all of the alternative light paths contribute to the cumulative transmission spectrum. This spectrum can be differentiated with respect to wavelength absorption peaks characteristic of the gas. Cut-off modulation can perform the differentiation function directly, since it is a form of wavelength modulation spectroscopy (WMS), a technique which is known to have several advantages in gas analysis applications. First the ratio of the ac to the dc response is simply the absorbance (delta I/I) of the spectral line, independent of baseline drift due to aging of the source, detector, or reflectivity of the cell walls. Thus, WMS gives advantages of a two-beam spectrophotometer. Second, it is useful in measuring the concentration of an analyte whose peak is obscured by a larger and broader overlapping peak due to something else in the sample. By ramping the tuned wavelength over a significant spectral range, a number of gas species can be separately identified, with perhaps more than one spectral line per specie to provide unambiguous identification in the case of overlapping spectral lines. This embodiment makes a very attractive process analyzer for a wide range of industrial applications.

ACTUATORS

The mechanical system of value for driving the tunable optical filters should preferably have an output force in the range of 0.001 Newton, with a travel exceeding 100 microns. A magnetic actuator meeting these requirements was designed and fabricated at the University of Wisconsin at Madison, Wis., has been designed for driving the tunable filter which uses an electromagnet which pulls a plunger into an air gap. The magnetic design depends heavily upon the available magnetic material. Preferably, electroplated permalloy (78% Ni, 22% Fe) should be used. Very thick films (at least 150 microns) have been produced and operate very well. These permalloy films have a measured permeability of 2000, and saturate near 10,000 Gauss and have a coercivity near 0.3 Oersted. It is therefore a soft magnetic material which can be analyzed by reluctance calculations.

Coil fabrication techniques used for building devices according to this invention presently involve 25 micron diameter aluminum wire sections, which limits the electrical current in the coil to 0.6 amperes. Transformer designs at 150 micron thickness require a 20 micron air gap saturation, i.e., BMAX=1 TESLA, at 0.6 amperes of electrical current. This requirement sets the number of coil turns which for the present design is 18. In FIG. 14, it can be seen that the electromagnet drives a keeper, or plunger, into the gap. The force behavior can be estimated by one dimensional reluctance calculations. These calculations may then refined by finite element analysis.

The actuator described here, and shown in FIG. 14 is constrained by a lateral guide spring 25. The Figure illustrates one of several possibilities for the spring design. The spring design must contend with a suitable spring constant in the compression direction, and a very large range of extension. Typical spring constants are near 0.006 Newtons/micron.

The actual spring design requires mechanical constants for the spring material. Estimated Young's modulus is 200 GPa and conservative designs have been used for the spring structures with maximum strains of 0.05%. Based on our observations of the electroplated permalloy, it may be possible to design springs for maximum strains of two percent (2%).

Often times, with certain actuator designs the spring constant in the axial direction is tightly controlled and of minimum magnitude. However, the undesirable spring constant normal to the intended axial motion can be quite large. This does not prevent the torsional spring constant from being weak and therefore lateral motion and rotation in the plane of the spring(s) can become troublesome. This difficulty may be eliminated using the guide springs 25 which can be simply tethered springs or S-shaped springs, of suitable thickness and resilience for the intended operating environment.

During operation, the guides springs 25 assembly only touches the substrate at the supports and therefore completely avoids sliding friction.

The electrical impedance for driving the prototype actuators is typically the series connection of the winding resistance and the coil inductive reactance. For the coils described above, wiring resistances at 18 turns are near 5 Ohms, the inductor value around 0.1 microhenries.

Figure 5:
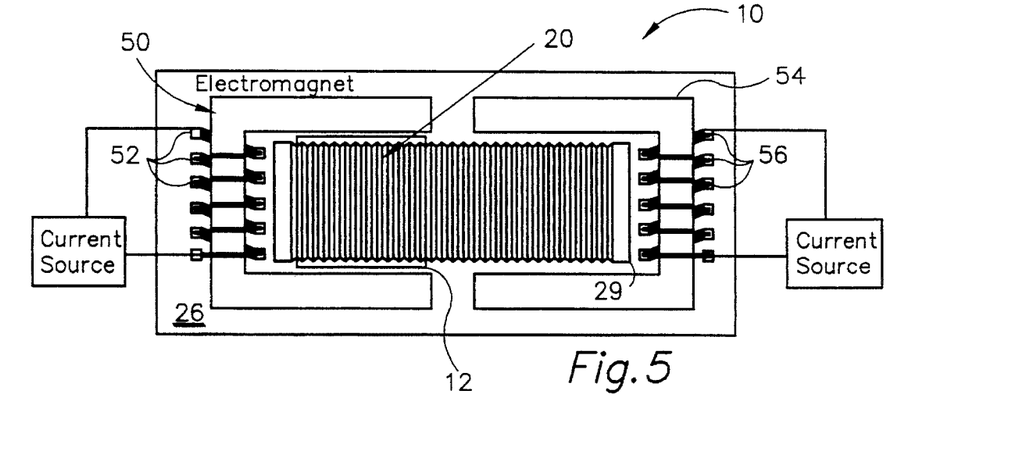
FIG. 5 illustrates an electromagnetic driver usable with the present invention.

FIG. 5 shows an embodiment in which the filter plates themselves are magnetic and are the moveable part of the linear actuator. The filter 20 is constructed of twice as many plates as needed to cover the transmission window, and is attached to the substrate 26 at both ends. Two electromagnets 50,54 are used, with the first 50 pulling the magnetic plates into the field of the transmission window, and thereby compressing the plate spacings and decreasing the cut-off wavelength. The second magnet 54 stretches the flexures of the plate array thereby increasing the plate spacings and increasing the cut-off wavelength. It is expected that the pole faces of 50 and 54 will have to be properly shaped in order that the plate spacings remain uniform during the deformations caused by the electromagnets. The task of optimizing the pole face shape can be done using well-established finite element magnetic modeling analysis methods. This arrangement provides a compact and rugged arrangement without the need for additional stabilization transverse to the axis of motion, as described above. The electromagnets 50,54 and the filters 20 can be fabricated simultaneously with the same mask, and plating sequence, using a soft magnetic material such as permalloy.

The actuator device portion of the present invention can be applied in other areas to take advantage of their significant displacement and force capabilities. For example, in moving microminiature optical disc drives or as simple micropositioners. Furthermore, other types of actuator devices may be used with the present invention such as electromechanical, mechanical (such as a manually actuated micrometer or an apparatus driven by cam 40, as shown in FIG. 6), other direct manual drives, magnetic drives, electrostatic drives, resonant drives which combine dc manual and ac resonant drive (on the order of hundreds of hertz), or combination drives with one type for coarse adjustment and another drive for fine adjustment.

PROCESSING

The processing steps for fixed parts starts with an oxided substrate and a 2 micron layer of nickel. The nickel layer is used for the lower portion of the coil which is patterned into the nickel. Insulation of this layer is provided by a 2 micron thick PECVD $SiO_2$ layer which is patterned with a contact cut mask to the nickel cross-unders. The process continues with the plating base. Typically Ti-Cu-Ti films near 1000 Angstrom in total thickness are used to assure substrate and plated metal adhesion. The x-ray photoresist is then applied, exposed and developed to produce the vertical sections of the coils, the transformer core, and the mechanical spring supports. The magnetic circuit portions of the actuator are electroplated NiFe with a height of 150 microns. After electroplating and clean-up the coils are closed by wire bonding.

The free-standing parts are formed by a similar sequence which uses a patterned sacrificial polyimide layer. The polyimide is not imidized and can be dissolved and removed laterally by using a base such as ammonium hydroxide which completely releases the parts. The spring keeper structure were also NiFe electroplated to a height of 80 microns.

The detailed processing steps for the fabrication of the plates and actuators are described herein and illustrated in FIG. 13. Silicon substrates are used in the fabrication as illustrated. After cleaning the silicon wafers, a thermal oxide is grown to passivate the substrates. This oxide layer also provides improved adhesion for the following deposition steps. A silicon nitride film is deposited on both sides of the wafer. This film may be deposited by LPCVD or by conventional sputtering. The first level of metallization is deposited and patterned on the front side of the wafers. This metallization is patterned to form device interconnections, leadouts and the bottom interconnection of the coil turns for the solenoids. The bottom pads of the LIGA-plated posts that form the two sides of the coil turns is also patterned.

The first-level metallization is passivated by a sputter-deposited silicon nitride film. The silicon nitride and oxide layers on the backside of the wafer are then patterned using a plasma etch to form a radiation transmission window. An IR aligner used to align the backside pattern with the first-level metallization pattern on the front side of the wafers. The transmission window will be aligned to the area where the LIGA grating will be formed.

The sacrificial layer is then deposited and patterned on the front side of the wafers. The sacrificial layer can be either a polyimide layer or a deposited silicon dioxide film. The sacrificial layer is patterned under all of the structure areas to be released from the substrate, including the grating and portion of the drive structures.

An opening or via to the first level metals is patterned and etched on the front side of the wafers to provide electrical interconnection between the first level metallization and the LIGA-plated material. The plating base metals are then deposited on the front of the wafers. A Ti/Ni double layer plating base may be used. The plating base does not have to be patterned in the currently envisioned process for the tunable grating structure, but it may be necessary to add a mask level to pattern the plating base if it is beneficial to remove it from some areas.

A thick PMMA (poly methyl-metancrylate)resist layer is then deposited on the substrates. This film will be used to form the pattern for the plated metal. This resist layer can be 100–200 microns thick depending on the dimensions of the structures to be made. The PMMA is patterned using the synchrotron x-ray radiation and x-ray mask level.

By using sheets of optimized PMMA, machining it to size, and solvent bonding the strain free material to the substrate of choice PMMA thicknesses in the few millimeter range are possible. The desired photoresist thickness is achieved by milling the polymer layer to the desired value, mild annealing to remove tool strain, and if so desired, mechanical polishing. This technique has been used to produce photoresist thicknesses from 50 microns to several centimeters.

Exposure of these extreme photoresist thicknesses is possible if proper x-ray photon energies are used. Thus at 3000 eV the absorption length in PMMA is roughly 100 microns which would imply maximum, reasonable exposure depths to about 500 microns. On the other hand, 20,000 eV photons have absorption lengths of one centimeter in PMMA and have been used experimentally to expose to 10 centimeter depths. This work was carried out by the University of Wisconsin, Wisconsin Center for Applied Microelectronics, Madison, Wis., USA, where many of the processes described herein have been developed and where many of the devices described herein have been fabricated.

Metal is plated into the pattern in the thick resists layer to form the LIGA structures. The PMMA is then removed, followed by etching to remove the plating base. Removing the plating base removes the interconnections between devices and also allows access to the sacrificial layer. The now accessible sacrificial layer is then removed with a liquid etch. This step releases the moving parts of the structure from the substrates.

The transmission window through the silicon substrate is formed by clamping the wafer into a mechanical fixture that will isolate and protect the LIGA structures from the silicon etch. The wafer is then etched from the backside by an anisotropic silicon which stops at the silicon nitride layers at the front side of the wafer, thus forming a nitride diaphragm. This nitride diaphragm may then be removed using a plasma etch from the back side of the wafer. These techniques for forming windows through silicon wafers have been demonstrated at Honeywell as well as elsewhere. As an alternative, the silicon nitride diaphragm window can be left in place to prevent environmental particles as long as its transmission properties do not interfere with the operation of the filter.

The devices are completed by wire bonding to form the top connection for solenoids and electromechanical drive structures in a relatively simple process. The basic process described herein has five patterning steps (six if the plating base is patterned). It also requires an optical mask to make the x-ray mask. This process does not require the development of a two-level LIGA process, but such a process may prove beneficial in production.

Figure 10:
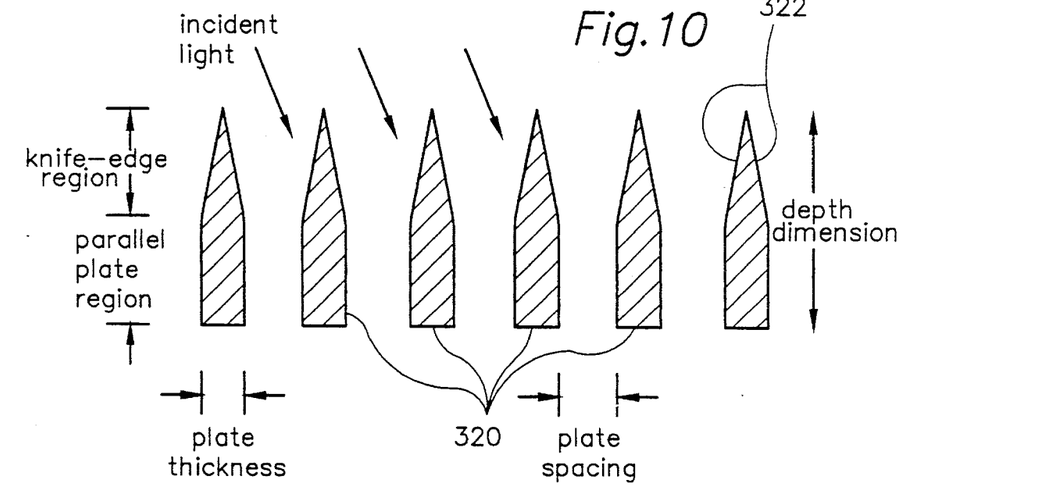
FIG. 10 is a elevational side view in cross section of an alternative embodiment of the parallel plates of the present invention disposed to receive incident radiation.

The mathematical modeling (FIG. 3) shows that the sharpness of the cut-off improves as the depth of the filter is increased, as expected from the waveguide analogy. An undesirable effect is that the transmission at off-normal angles is decreased, even though the sharp cut-off characteristic is maintained. This decrease can be ameliorated using a knife-edge taper 322 as shown in FIG. 10. An array of such knife-edge objects 320 is known to have very low reflectivity over a wide field of view. It may be beneficial to have the knife-edge on the bottom of the array as well to minimize reflection of transmitted light back into the parallel plate region.

The knife-edge structures 320 can be fabricated by a sputtering or ion-milling process of LIGA structures. The LIGA filters are fabricated to the full depth including the knife-edge regions. The top surface is then coated with a thin film of a metal which is hard to sputter, such as chromium metal. The sputtering or ion milling process then attacks the side walls of the filter plate and erodes them much faster than it erodes the chromium. The process is halted at the point that the chrome disappears due to the sputtering, thus leaving the knife-edge structure.

The parallel plate filter component may of course comprise an array of metallic plates, which preferably consist of gold or silver, but permalloy, or nickel, or other material coated with a suitable metal, such as gold or silver provides acceptable performance. Metallized resin-based materials may also be used in the array as well as any material that reflect radiation in the IR spectrum.

With respect to the substrate or base member of the present invention, it should be appreciated that the transmission window can be an aperture, or covered with a material that transmits the type of radiation of interest, and need not be a semiconductor material. The stability requirement dictates however that the material be substantially rigid. It should be noted also, that for certain applications it may be desirable to encapsulate the filter so that undesirable particulate matter or other substances that can negatively affect the performance of the filter are avoided. Such an encapsulation can be grown in repeated epitaxial growing steps with etching steps to evacuate a sacrificial portion surrounding the filter, or by enclosing the filter in a material that transmits in the radiation spectrum of interest.

While the present invention operates effectively in varying conditions of radiation angles of incidence, it will also operate if the radiation is directed to the filter along one or more mutlimode optical fibers capable of carrying IR radiation, either remotely or proximate suitable imaging apparatus.

Although the LIGA process is the best-established method of fabricating the very deep lamellar structures required for the filter of the present invention, there are several suitable alternatives which may less expensive than the LIGA process in implantation. For example, the Technical Digest of the Solid-State Sensor and Actuator Workshop held at Hilton Head, S.C., June 1994 session, describes several different methods. The Georgia Institute of Technology has an approach described on page 90 describing a UV light-based and a photosensitive polyimide process (PSPI) to produce a high aspect ratio polyimide mold into which aluminum can be electroplated. On page 82 of the proceedings, the University of Michigan and General Motors corporation describe a process for dry etching of polyimide using an electron cyclotron resonance source (ECR) to produce a structure for nickel electroplating. Removal of the polyimide produces high aspect ratio structures similar to those required for the filter. The University of California at Berkeley describes on page 132 a HEXSIL process for fabricating deep trenches in silicon to make a mold which can be used to replicate deep lamellar polysilicon structures. At this point these alternative approaches do not have the surface finish or structural accuracy demonstrated by the LIGA process.

While the present invention has been described by various embodiments they are illustrative and in no manner should they limit the scope of the invention, other embodiments can come within the scope and spirit of the invention as defined by the claims, which alone define the boundaries of the present invention.

We claim:

1. An optical filter for altering incident radiation ranging from sub-micron to multi-millimeter wavelengths, comprising:

a base member having a radiation transmission aperture formed therethrough;

an array of deep lamellar structures coupled to the base member and disposed across at least a portion of the radiation transmission aperture wherein the array of deep lamellar structures further comprise a plurality of substantially identical parallel plate members coupled so that each successive parallel plate member is equidistant from the next successive parallel plate member.

2. The filter of claim 1, wherein the array of deep lamellar structures has a first parallel plate member which is rigidly fixed to the base member and a last parallel plate member which is movably coupled with respect to the base member.

3. The filter of claim 1 wherein each parallel plate member of the array of deep lamellar structures is formed of a highly reflective material.

4. The filter of claim 3 wherein each parallel plate member of the array of deep lamellar structures is formed of a metal.

5. The filter of claim 1 wherein each parallel plate member of the array of deep lamellar structures is coated with a material that is highly reflective to the incident radiation.

6. The filter of claim 5 wherein an upper portion of each parallel plate member exposed to the initial impingement of the incident radiation is tapered uniformly on the opposing lateral faces of each parallel plate member.

7. The filter of claim 6 wherein a lower portion opposite the upper portion of each parallel plate member is tapered uniformly on opposing lateral faces of each plate.

8. The filter of claim 5, further comprising a second array, similar to the first array of deep lamellar structures, disposed proximate the first array of deep lamellar structures and wherein each of the respective parallel plate members of the first array of deep lamellar structures and each of the respective parallel plate members of the second array are oriented orthogonal to each other so that a two-dimensional lattice structure is formed.

9. The filter of claim 8, wherein each successive parallel plate member associated with the second array are spaced apart from each other equally at a different distance than the parallel plate members of the first array of deep lamellar structures are spaced from the next successive plates of the first array of deep lamellar structures.

10. A tunable optical filter for altering incident radiation ranging from sub-micron to multi-millimeter wavelengths, comprising:

a substrate having an aperture for admitting radiation therethrough;

a stationary structure connected to the substrate proximate the aperture;

a filter endpiece member flexibly coupled to at least one portion of the filter array and disposed proximate the aperture and opposing the stationary structure across from the aperture;

a filter array subassembly flexibly coupled between the filter endpiece member and a closure member, wherein the array subassembly further comprises;

a plurality of parallel plate members having a first plate member coupled to the closure member and a last plate coupled to the filter endpiece member;

a plurality of flexures mechanically coupling successive parallel plate members one to the other; and drive means coupled to the endpiece for controllably driving the filter array subassembly with respect to the stationary structure.

11. An optical filter for altering incident radiation ranging from sub-micron to multi-millimeter wavelengths, comprising:

a base member having a radiation transmission aperture formed therethrough;

an array of deep lameliar structures coupled to the base member and disposed across at least a portion of the radiation transmission aperture, wherein the array of deep lameliar structures further comprises an array of substantially identical parallel plate members coupled together along at least two opposing lateral edges so that each parallel plate member is equidistant from the next successive parallel plate member; and linear actuator means for controllably articulating the array of deep lameliar structures.

12. The filter of claim 11, wherein a first parallel plate member is fixed to the base member and a last parallel plate member of the array is coupled to the base member.

13. The filter of claim 11 wherein each parallel plate member is formed of a highly reflective material.

14. The filter of claim 13 wherein each parallel plate member is formed of a metal.

15. The filter of claim 11 wherein each parallel plate member is coated with a material that is highly reflective to the incident radiation.

16. The filter of claim 15 wherein an upper portion of each of the parallel plate members nearest a point of initial impingement upon the parallel plate members of the incident radiation is tapered uniformly on the both lateral faces.

17. The filter of claim 16 wherein a lower portion, opposite the upper portion, of each of the parallel plate members is tapered uniformly on both lateral faces of each plate.

18. The filter of claim 15, further comprising a second array of deep lamellar structures, similar to the first array of deep lamellar structures, and disposed proximate the first array, wherein the plates of the first array of deep lameliar structures and the second array of deep lamellar structures are oriented orthogonal to each other.

19. The filter of claim 18, wherein each successive parallel plate member associated with the second array of deep lamellar structures are spaced apart from each other a different distance than the parallel plate members of the first array of the deep lamellar structures are spaced from the next successive parallel plate members of the first array of deep lameliar structures.

20. The filter of claim 15, wherein the linear actuator means is constrained to linear motion by at least one lateral guide spring member connected to the linear actuator at a first end of the guide spring member and coupled to the substrate at a second end of the guide spring member.

* * * * *

UNITED STATES PATENT AND TRADEMARK OFFICE
CERTIFICATE OF CORRECTION

PATENT NO. : 5,483,387
DATED : January 9, 1996
INVENTOR(S) : Paul E. Bauhahn, Thomas Ohnstein, James D. Zook It is certified that error appears in the above-indentified patent and that said Letters Patent is hereby corrected as shown below:

Column 1, line 2, insert the following information:
next line --The Government has rights in this invention pursuant to Contract No. DABT63-93-C-0066, awarded by the Department of the Army.

Signed and Sealed this

Eighth Day of July, 1997

*Attest:*

BRUCE LEHMAN

*Attesting Officer*  *Commissioner of Patents and Trademarks*